US009047458B2

(12) United States Patent
Etchegoyen

(10) Patent No.: US 9,047,458 B2
(45) Date of Patent: Jun. 2, 2015

(54) NETWORK ACCESS PROTECTION

(75) Inventor: Craig S. Etchegoyen, Irvine, CA (US)

(73) Assignee: DeviceAuthority, Inc., Fremont, CA (US)

( * ) Notice: Subject to any disclaimer, the term of this patent is extended or adjusted under 35 U.S.C. 154(b) by 353 days.

(21) Appl. No.: 12/784,455

(22) Filed: May 20, 2010

(65) Prior Publication Data
US 2010/0325710 A1 Dec. 23, 2010

Related U.S. Application Data

(60) Provisional application No. 61/218,593, filed on Jun. 19, 2009.

(51) Int. Cl.
H04L 9/32 (2006.01)
G06F 21/44 (2013.01)
G06F 21/31 (2013.01)
G06F 21/73 (2013.01)

(52) U.S. Cl.
CPC .............. *G06F 21/44* (2013.01); *G06F 21/31* (2013.01); *G06F 21/73* (2013.01)

(58) Field of Classification Search
CPC .......... G06F 21/31; G06F 21/44; G06F 21/73
USPC ............................................ 726/2, 7, 27–29
See application file for complete search history.

(56) References Cited

U.S. PATENT DOCUMENTS

| 4,246,638 | A | 1/1981 | Thomas |
| 4,351,982 | A | 9/1982 | Miller et al. |
| 4,658,093 | A | 4/1987 | Hellman |
| 4,704,610 | A | 11/1987 | Smith et al. |

(Continued)

FOREIGN PATENT DOCUMENTS

| AU | 678985 | 6/1997 |
| DE | 101 55 755 A1 | 5/2003 |

(Continued)

OTHER PUBLICATIONS

Posting from Slashdot.org on the article "Smart Cards for Windows XP Login " Comment "Re: PIN" posted Dec. 3, 2001. http://ask.slashdot.org/comments.pl?sid=24411&cid=2648374.*
Wikipedia article for "Two-factor authentication" Article published Jun. 3, 2008 (7 pages) http://en.wikipedia.org/w/index.php?title=Two-factor_authentication&oldid=216794321.*
Williams, R., "A Painless Guide to CRC Error Detection Algorithms", Ver. 3, Aug. 19, 1993.

(Continued)

*Primary Examiner* — Joseph P Hirl
*Assistant Examiner* — Thomas Gyorfi
(74) *Attorney, Agent, or Firm* — Ramirez & Smith

(57) ABSTRACT

A system or method for network access protection executes steps for receiving, at a server, an access request for access to at least one network resource from a client machine, the access request including account authentication information comprising an account identifier and password, obtaining a client machine identifier from the client machine in response to receiving the request for access, and controlling access to the network resource in response to the access request by authorizing access to the network resource for the access request if the client machine identifier matches a registered machine identifier that is registered for use with the account authentication information and the account authentication information matches registered information for a valid account, but denying access to the network resource if the client machine identifier does not match a registered client machine identifier that is registered for use with the account authentication information.

17 Claims, 6 Drawing Sheets

(56) References Cited

U.S. PATENT DOCUMENTS

| | | | |
|---|---|---|---|
| 4,779,224 A | 10/1988 | Moseley et al. | |
| 4,796,220 A | 1/1989 | Wolfe | |
| 4,891,503 A | 1/1990 | Jewell | |
| 4,956,863 A | 9/1990 | Goss | |
| 5,210,795 A | 5/1993 | Lipner et al. | |
| 5,235,642 A | 8/1993 | Wobber et al. | |
| 5,239,166 A | 8/1993 | Graves | |
| 5,241,594 A | 8/1993 | Kung | |
| 5,291,598 A | 3/1994 | Grundy | |
| 5,414,269 A | 5/1995 | Takahashi | |
| 5,418,854 A | 5/1995 | Kaufman et al. | |
| 5,440,635 A | 8/1995 | Bellovin et al. | |
| 5,490,216 A | 2/1996 | Richardson, III | |
| 5,666,415 A | 9/1997 | Kaufman | |
| 5,745,879 A | 4/1998 | Wyman | |
| 5,754,763 A | 5/1998 | Bereiter | |
| 5,790,664 A | 8/1998 | Coley et al. | |
| 5,925,127 A | 7/1999 | Ahmad | |
| 5,974,150 A | 10/1999 | Kaish et al. | |
| 6,009,401 A | 12/1999 | Horstmann | |
| 6,041,411 A | 3/2000 | Wyatt | |
| 6,044,471 A | 3/2000 | Colvin | |
| 6,158,005 A | 12/2000 | Bharathan et al. | |
| 6,167,517 A | 12/2000 | Gilchrist et al. | |
| 6,230,199 B1 | 5/2001 | Revashetti et al. | |
| 6,233,567 B1 | 5/2001 | Cohen | |
| 6,243,468 B1 | 6/2001 | Pearce et al. | |
| 6,294,793 B1 | 9/2001 | Brunfeld et al. | |
| 6,330,608 B1 | 12/2001 | Stiles | |
| 6,330,670 B1 | 12/2001 | England et al. | |
| 6,418,472 B1 | 7/2002 | Mi et al. | |
| 6,449,645 B1 | 9/2002 | Nash | |
| 6,536,005 B1 | 3/2003 | Augarten | |
| 6,785,825 B2 | 8/2004 | Colvin | |
| 6,799,272 B1 | 9/2004 | Urata | |
| 6,826,690 B1 | 11/2004 | Hind et al. | |
| 6,859,793 B1 | 2/2005 | Lambiase | |
| 6,920,567 B1 | 7/2005 | Doherty et al. | |
| 6,976,009 B2 | 12/2005 | Tadayon et al. | |
| 6,981,145 B1 | 12/2005 | Calvez et al. | |
| 7,032,110 B1 | 4/2006 | Su et al. | |
| 7,069,440 B2 | 6/2006 | Aull | |
| 7,069,595 B2 | 6/2006 | Cognigni et al. | |
| 7,082,535 B1 | 7/2006 | Norman et al. | |
| 7,083,090 B2 | 8/2006 | Zuili | |
| 7,085,741 B2 | 8/2006 | Lao et al. | |
| 7,100,195 B1 | 8/2006 | Underwood | |
| 7,178,025 B2 | 2/2007 | Scheidt et al. | |
| 7,181,615 B2 | 2/2007 | Fehr et al. | |
| 7,188,241 B2 | 3/2007 | Cronce et al. | |
| 7,203,966 B2 | 4/2007 | Abburi et al. | |
| 7,206,765 B2 | 4/2007 | Gilliam et al. | |
| 7,233,997 B1 | 6/2007 | Leveridge et al. | |
| 7,234,062 B2 | 6/2007 | Daum et al. | |
| 7,272,728 B2 | 9/2007 | Pierson et al. | |
| 7,305,562 B1 | 12/2007 | Bianco et al. | |
| 7,310,813 B2 | 12/2007 | Lin et al. | |
| 7,319,987 B1 | 1/2008 | Hoffman et al. | |
| 7,327,280 B2 | 2/2008 | Bachelder et al. | |
| 7,337,147 B2 | 2/2008 | Chen et al. | |
| 7,343,297 B2 | 3/2008 | Bergler et al. | |
| 7,418,665 B2 | 8/2008 | Savage | |
| 7,463,945 B2 | 12/2008 | Kiesel et al. | |
| 7,590,852 B2 | 9/2009 | Hatter et al. | |
| 7,653,899 B1 | 1/2010 | Lindahi et al. | |
| 7,836,121 B2 | 11/2010 | Elgressy et al. | |
| 8,171,287 B2 | 5/2012 | Villela | |
| 8,327,448 B2 | 12/2012 | Eldar et al. | |
| 8,484,705 B2 | 7/2013 | Hoppe et al. | |
| 2001/0034712 A1 | 10/2001 | Colvin | |
| 2001/0044782 A1 | 11/2001 | Hughes et al. | |
| 2002/0019814 A1 | 2/2002 | Ganesan | |
| 2002/0065097 A1 | 5/2002 | Brockenbrough et al. | |
| 2002/0082997 A1 | 6/2002 | Kobata et al. | |
| 2002/0091937 A1 | 7/2002 | Ortiz | |
| 2002/0116616 A1* | 8/2002 | Mi et al. | 713/168 |
| 2002/0161718 A1 | 10/2002 | Coley et al. | |
| 2002/0178366 A1 | 11/2002 | Ofir | |
| 2003/0001721 A1 | 1/2003 | Daum et al. | |
| 2003/0056107 A1 | 3/2003 | Cammack et al. | |
| 2003/0065918 A1 | 4/2003 | Willey | |
| 2003/0097331 A1 | 5/2003 | Cohen | |
| 2003/0116621 A1 | 6/2003 | Duncan | |
| 2003/0120920 A1 | 6/2003 | Svensson | |
| 2003/0125975 A1 | 7/2003 | Danz et al. | |
| 2003/0156719 A1* | 8/2003 | Cronce | 380/256 |
| 2003/0172035 A1 | 9/2003 | Cronce et al. | |
| 2003/0182428 A1 | 9/2003 | Li et al. | |
| 2003/0204726 A1 | 10/2003 | Kefford et al. | |
| 2004/0003228 A1 | 1/2004 | Fehr et al. | |
| 2004/0024860 A1 | 2/2004 | Sato et al. | |
| 2004/0026496 A1 | 2/2004 | Zuili | |
| 2004/0030912 A1 | 2/2004 | Merkle et al. | |
| 2004/0049685 A1 | 3/2004 | Jaloveczki | |
| 2004/0059929 A1 | 3/2004 | Rodgers et al. | |
| 2004/0107360 A1 | 6/2004 | Herrmann et al. | |
| 2004/0117321 A1 | 6/2004 | Sancho | |
| 2004/0143746 A1 | 7/2004 | Ligeti et al. | |
| 2004/0149820 A1 | 8/2004 | Zuili | |
| 2004/0172531 A1* | 9/2004 | Little et al. | 713/155 |
| 2004/0177255 A1 | 9/2004 | Hughes | |
| 2004/0187018 A1 | 9/2004 | Owen et al. | |
| 2005/0018687 A1 | 1/2005 | Cutler | |
| 2005/0034115 A1 | 2/2005 | Carter et al. | |
| 2005/0108173 A1 | 5/2005 | Stefik et al. | |
| 2005/0138155 A1 | 6/2005 | Lewis | |
| 2005/0166263 A1 | 7/2005 | Nanopoulos et al. | |
| 2005/0172280 A1 | 8/2005 | Ziegler et al. | |
| 2005/0182732 A1 | 8/2005 | Miller et al. | |
| 2005/0268087 A1 | 12/2005 | Yasuda et al. | |
| 2006/0005237 A1 | 1/2006 | Kobata et al. | |
| 2006/0036766 A1 | 2/2006 | Baupin et al. | |
| 2006/0072444 A1 | 4/2006 | Engel et al. | |
| 2006/0080534 A1 | 4/2006 | Yeap et al. | |
| 2006/0085310 A1 | 4/2006 | Mylet et al. | |
| 2006/0090070 A1 | 4/2006 | Bade et al. | |
| 2006/0095454 A1 | 5/2006 | Shankar et al. | |
| 2006/0115082 A1 | 6/2006 | Kevenaar et al. | |
| 2006/0161914 A1 | 7/2006 | Morrison et al. | |
| 2006/0168580 A1 | 7/2006 | Harada et al. | |
| 2006/0265337 A1 | 11/2006 | Wesinger, Jr. | |
| 2006/0265446 A1 | 11/2006 | Elgressy et al. | |
| 2006/0282511 A1 | 12/2006 | Takano et al. | |
| 2007/0061566 A1 | 3/2007 | Bailey et al. | |
| 2007/0078785 A1* | 4/2007 | Bush et al. | 705/72 |
| 2007/0094715 A1 | 4/2007 | Brown et al. | |
| 2007/0113090 A1 | 5/2007 | Villela | |
| 2007/0124689 A1 | 5/2007 | Weksel | |
| 2007/0143073 A1 | 6/2007 | Richardson et al. | |
| 2007/0143408 A1 | 6/2007 | Daigle | |
| 2007/0143838 A1 | 6/2007 | Milligan et al. | |
| 2007/0168288 A1 | 7/2007 | Bozeman | |
| 2007/0174633 A1 | 7/2007 | Draper et al. | |
| 2007/0198422 A1 | 8/2007 | Prahlad et al. | |
| 2007/0198850 A1 | 8/2007 | Martin et al. | |
| 2007/0203846 A1 | 8/2007 | Kavuri et al. | |
| 2007/0207780 A1 | 9/2007 | McLean | |
| 2007/0209064 A1 | 9/2007 | Qin et al. | |
| 2007/0219917 A1 | 9/2007 | Liu et al. | |
| 2007/0260883 A1 | 11/2007 | Giobbi et al. | |
| 2007/0282615 A1 | 12/2007 | Hamilton et al. | |
| 2008/0028455 A1 | 1/2008 | Hatter et al. | |
| 2008/0052775 A1 | 2/2008 | Sandhu et al. | |
| 2008/0065552 A1 | 3/2008 | Elazar et al. | |
| 2008/0086423 A1 | 4/2008 | Waites | |
| 2008/0104683 A1 | 5/2008 | Nagami et al. | |
| 2008/0120195 A1 | 5/2008 | Shakkarwar | |
| 2008/0120707 A1 | 5/2008 | Ramia | |
| 2008/0147556 A1 | 6/2008 | Smith et al. | |
| 2008/0152140 A1 | 6/2008 | Fascenda | |
| 2008/0177997 A1 | 7/2008 | Morais et al. | |
| 2008/0228578 A1 | 9/2008 | Mashinsky | |
| 2008/0242405 A1 | 10/2008 | Chen et al. | |
| 2008/0261562 A1 | 10/2008 | Jwa et al. | |

(56) References Cited

U.S. PATENT DOCUMENTS

| | | | |
|---|---|---|---|
| 2008/0268815 A1 | 10/2008 | Jazra et al. | |
| 2008/0289025 A1 | 11/2008 | Schneider | |
| 2008/0320607 A1 | 12/2008 | Richardson | |
| 2009/0003600 A1 | 1/2009 | Chen et al. | |
| 2009/0019536 A1 | 1/2009 | Green et al. | |
| 2009/0083730 A1 | 3/2009 | Richardson | |
| 2009/0083833 A1 | 3/2009 | Ziola et al. | |
| 2009/0113088 A1 | 4/2009 | Illowsky et al. | |
| 2009/0119744 A1 | 5/2009 | Lange et al. | |
| 2009/0132813 A1 | 5/2009 | Schibuk | |
| 2009/0138643 A1 | 5/2009 | Charles et al. | |
| 2009/0138975 A1 | 5/2009 | Richardson | |
| 2009/0198618 A1 | 8/2009 | Chan et al. | |
| 2009/0271851 A1 | 10/2009 | Hoppe et al. | |
| 2009/0300744 A1 | 12/2009 | Guo et al. | |
| 2010/0197293 A1 | 8/2010 | Shem-Tov | |
| 2010/0306038 A1 | 12/2010 | Harris | |
| 2010/0332337 A1* | 12/2010 | Bullock | 705/26 |
| 2011/0093943 A1 | 4/2011 | Nakagawa et al. | |

FOREIGN PATENT DOCUMENTS

| | | |
|---|---|---|
| EP | 1 739 879 | 6/2005 |
| EP | 1637958 | 3/2006 |
| EP | 1637961 | 3/2006 |
| EP | 1670188 | 6/2006 |
| EP | 2312483 | 4/2011 |
| EP | 2323062 | 5/2011 |
| GB | 2355322 | 4/2001 |
| GB | 2434724 | 8/2007 |
| WO | WO 92/09160 | 5/1992 |
| WO | WO 9220022 | 11/1992 |
| WO | WO 9301550 | 1/1993 |
| WO | WO 9535533 | 12/1995 |
| WO | WO 00/58895 | 10/2000 |
| WO | WO 0067095 | 11/2000 |
| WO | WO 01/90892 | 11/2001 |
| WO | WO 03/032126 | 4/2003 |
| WO | WO 2004/054196 | 6/2004 |
| WO | WO 2005104686 | 11/2005 |
| WO | WO2007060516 | 5/2007 |
| WO | WO2008013504 | 1/2008 |
| WO | WO 2008/127431 | 10/2008 |
| WO | WO2008157639 | 12/2008 |
| WO | WO2009039504 | 3/2009 |
| WO | WO2009065135 | 5/2009 |
| WO | WO2009076232 | 6/2009 |
| WO | WO2009105702 | 8/2009 |
| WO | WO2009143115 | 11/2009 |
| WO | WO 2009158525 | 12/2009 |
| WO | WO 2010/093683 | 8/2010 |
| WO | WO 2011/032605 | 3/2011 |

OTHER PUBLICATIONS

Angha, F. et al., "Securing Transportation Network Infrastructure with Patented Technology of Device Locking—Developed by Uniloc USA", avail. at: http://www.dksassociates.com/admin/paperfile/ITS%20World%20Paper%20Submission_Uniloc%20_2_.pdf, Oct. 24, 2006.

Econolite, "Econolite and Uniloc Partner to Bring Unmatched Infrastructure Security to Advanced Traffic Control Networks with Launch of Strongpoint", avail. at: http://www.econolite.com/docs/press/20080304_Econolite_StrongPoint.pdf, Mar. 4, 2008.

Choudhary et al., "A Cross-browser Web Application Testing Tool," 26th IEEE International Conference on Software Maintenance, Issue Date Sep. 12-18, 2010.

Housley et al., "Internet x.509 Public Key Infracstructure Certificate and CRL Profile," *The Internet Society*, Network Working Group, 1999, 75 pages. [RFC 2459].

Jensen et al., "Assigning and Enforcing Security Policies on Handheld Devices," 2002, 8 pages.

Muncaster et al., "Continous Multimodal Authentication Using Dynamic Baysian Networks," Second Workshop on Multimodal User Authentication, Toulouse, France, May 11-12, 2006. XP55003041.

Sim et al. "Continous Verification Using Multimodal Biometrics", *IEEE Transactions on Pattern Analysis and Machine Intelligence*, vol. 29, No. 4, Apr. 1, 2007, IEEE Serivce Center, Los Alamitos, CA, pp. 687-700. XP011168507.

Wikipedia: "Software Extension," May 28, 2009, Internet Article retrieved on Oct. 11, 2010. XP002604710.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

"Canon User Manual—Nikon Coolpix S52/S52c," Apr. 21, 2008, entire manual.

David J-L, "Cookieless Data Persistence in Possible," Apr. 23, 2003, Internet Article retrieved on Sep. 21, 2010. XP002603490.

Johnson et al. "Dynamic Source Routing in Ad Hoc Wireless Networks," *Mobile Computing*, Kluwer Academic Publishers, 1996.

Iovation, "Using Reputation of Devices to Detect and Prevent Online Retail Fraud," *White Paper*, Apr. 2007.

Iovation, "Controlling High Fraud Risk of International Transactions," *Iovation Reputation Services, White Paper*, May 2007.

Posting from Slashdot on the article "Smart Cards for Windows XP Login" Comment "Re: PIN" posted Dec. 3, 2001. http://en.wikipedia.org/w/index.php ?title=Two-factor_authentication &ildid=216794321.

* cited by examiner

NETWORK ACCESS PROTECTION

This application claims priority to U.S. Provisional Application No. 61/218,593 which was filed Jun. 19, 2009 and which is fully incorporated herein by reference.

BACKGROUND

1. Field of the Invention

The present disclosure relates to methods and systems for protecting network computer systems and electronic content available through such network computer systems from unauthorized use or access.

2. Description of the Related Art

Various methods and systems exist for protecting computer networks from access by unauthorized individuals. Many such systems and methods rely on the use of a password or other authentication information entered by a computer user to authenticate access attempts. Access is permitted when authentication information supplied during an access attempt matches authentication information stored in the computer network and retrieved from storage in response to the attempted access. Such security protocols are vulnerable to unauthorized access by any person who is able to discover or correctly guess the authentication information associated with a particular user ID. Security breaches of such systems reportedly occur with alarming frequency, and sometimes result in serious harm.

More robust security systems are also known, that make use of special security devices such as hardware token authenticators, biometric data readers, and geographic locating devices. Information from such devices may be used together with password authenticators to authenticate access attempts and prevent unauthorized access to network resources. Such combination systems may increase network security, but at the cost of, and subject to proper operation of, additional hardware security devices. It would be desirable to enhance network security without requiring the use of additional hardware for authentication of access attempts.

SUMMARY OF THE INVENTION

The present technology uses a hardware fingerprint for one or more clients in a computer network system combined with traditional user identification/authentication information to authenticate access attempts and control access to network resources. The system utilizes at least one access control server in communication with one or more clients via a communications network, for controlling access to network resources. The server is configured to operate an Access Management Application (AMA) to perform authentication and authorization in connection with access requests received by the access control server.

The AMA may be configured to process input from an authenticated system administrator to create an access policy domain, comprising an authentication scheme, authorization rules, and network resource addresses. The authentication scheme may be implemented as an application module, stand-alone application, plug-in application, applet, or other executable code. The authentication scheme defines authentication process flow initiated in response to client requests for access to network resources. Network resources may comprise, for example, applications, web pages, electronic data, or any electronic data object that may be accessed by a client, including both executable applications and non-executable data.

Authorization rules and network resource addresses define parameters pertinent to operation of the authentication scheme. The authorization rules may define authorization levels, or authorization for use of specific network resources, to defined pairings of users and specific client machines. For example, the authorization rules may specify: (1) the highest access level to a known authorized user requesting access via a known registered client machine, (2) a provisional access level to a known authorized user requesting access via an unknown client machine, (3) a level restricted to user authentication resources to unknown user requests from a registered client, (4) a lower restricted access level to an unknown user requesting access via an unregistered client, and (5) no access to any user requesting access via a known unauthorized client. In the alternative, or in addition, the authorization rules may identify specific network resources that are authorized in connection with different user/client combinations as exemplified above. The authorization rules may be configured and maintained by a system administrator through the AMA to define the level of access granted to particular users, client machines, and user/machine pairs.

The network resource addresses may comprise Uniform Resource Locators (URL's) or other computer network addresses for locating any network resource to which the authorization rules apply. The AMA may be configured to recognize and apply the authorization rules to any request for a resource that uses the network resource address or addresses designated by the access policy domain. In some embodiments, the access policy domain may specify that all resources available to clients through the access control server are designated controlled resources, except for authorization resources such as login pages and hardware "fingerprint" comparison functions. In more secure environments, access to login resources may be permitted only to recognized client devices. In other embodiments, the access policy domain may specify a relatively small subset of network resources that are accessible through the access control server as the controlled network resources.

In any case, the network resources specified in the access policy domain should be exclusively available through the access control server, for example, by being stored in or served from nodes over which the access control server has exclusive control. Therefore, a client should be unable to access a controlled network resource except through the access control server. The access control server should therefore receive all requests for those resources that are capable of being fulfilled. The AMA should, in turn, apply the access control policy to determine which requests received by the access control server will be fulfilled, and which will be denied.

Registration of client machines is an important aspect of the present technology. The access control server maintains or has secure access to a registry of client identifiers. The client identifiers represent client hardware "fingerprints" gathered for each client entered in the client registry. A hardware fingerprint is characterized by being reliably reproducible by an application operating on a particular client machine, while being virtually irreproducible by any other means, and virtually impossible to guess using any systematic or brute force algorithm. In short, each fingerprint is a complex and unique data pattern generated from a stable system configuration of a particular client machine. Methods for generating a machine fingerprint are discussed in the detailed description below.

Registration of a client machine may be accomplished by generating a machine fingerprint on the machine as part of a secure session initiated through the AMA. For example, an authorized service technician may initiate a secure session using a client to be registered, with the resulting fingerprint stored in the client registry used by the access control server. The fingerprint need not be stored at the client device, and for greater system security, should not be stored anywhere except in the secure data registry and its secure data back-ups.

During an authentication session with the access control server, the AMA may generate a machine fingerprint by activating a fingerprint-generating application on the client machine. The fingerprint generating application may cooperate with the AMA to generate the fingerprint using a process that mirrors the fingerprint generating process used during registration of the client machine. Therefore, provided the client system configuration is unchanged, the resulting fingerprint will match the data in the client registry used by the AMA, positively identifying the client as a registered machine. The AMA may then apply the authorization rules to the specific access request or requests following successful authentication, in the manner described herein.

A more complete understanding of the system and method for network access control will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

Throughout the several figures and in the specification that follows, like element numerals are used to indicate like elements appearing in one or more of the figures.

DETAILED DESCRIPTION

The present technology provides network access control responsive to combinations of account (user) authenticated identifiers and client device identifiers to determine authorization for use of network resources.

Figure 1:
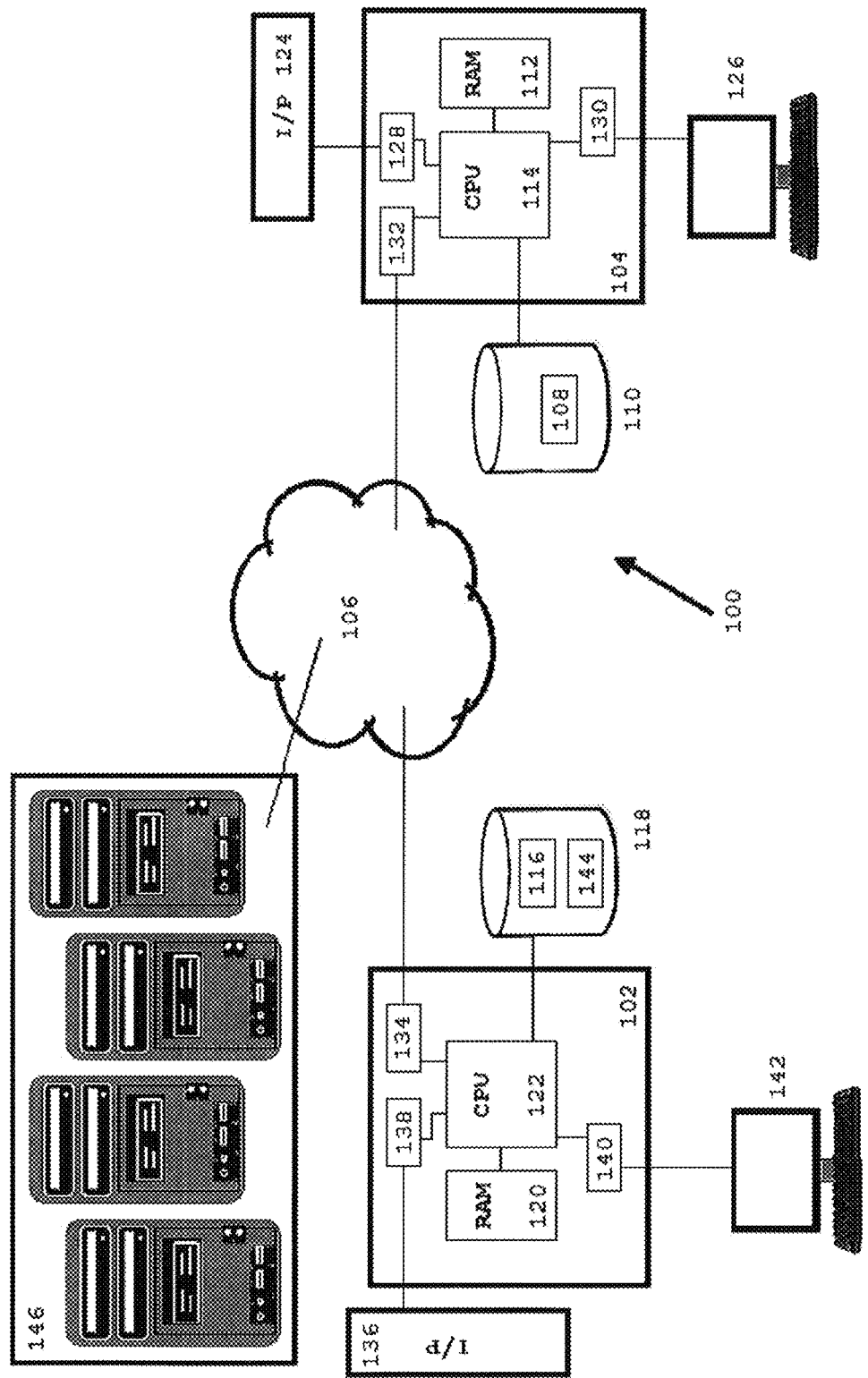
FIG. 1 is a schematic diagram showing elements of a system for performing network access control.

FIG. 1 shows a system 100 including a server 102 and a client device 104 in communication via a communications network 106. Communications network 106 may comprise the Internet, a cellular communications network, a satellite communications network, a local area network, or some combination of these or other suitable networks. The client device may be configured with a software executable file or files 108 encoded in a computer-readable media of a data storage device 110. When loaded into the client memory 112 and subsequently into the client processor 114, the executable file or files causes the client device to perform the client-side processes and outputs as described in more detail herein. Examples of suitable devices for use as client device 104 include personal computers, programmable communications devices such as mobile telephones and media players, "netbooks," and other programmable devices.

Likewise, the server 102 may be configured with a server-side application file or files 116, for example an access management application (AMA), encoded in a computer-readable media of a data storage device 118. When loaded into the server memory 120 and subsequently into the server processor 122, the executable file or files causes the client device to perform the server-side processes and outputs as described in more detail herein. File or files 108 and 116 may be developed by writing programming code in any suitable programming language to perform the actions and provide the outputs consistent with the disclosure herein, and compiling the code to provide machine-executable code. Like the client device 104, the server 102 may comprise any one of various suitable programmable computing devices. In the alternative, server 102 may comprise a coordinated assembly of such computing devices, for example, a server farm.

Generally, both the server 102 and the client 104 may be configured as input-transforming machines, the very purpose of which is to receive physical input from at least one client-side user input device 124 and provide a responsive physical output via a client-side output device 126, such as an audio-video output. Input device 124 may comprise various devices, for example, a keyboard, mouse, microphone, or other physical transducer connected to client 104 and configured to transform physical input from a user into a data signal, which may be routed through an interface device 128 and provided as input to processor 114. The processor 114, operating an executable as described herein, responds to the input signal and provides output data through a video interface 130 to a display device 126. The processor 114 may further receive input data from the server 102 or provide output to the server via network interface 132 and communications network 106.

Conversely, server 102 may receive input data from the client 104 or provide output to the client via network interface 134 and communications network 106. Optionally, server 102 may comprise an input device 136 in communication with the processor 120 via an interface 138, and provide output via a video processor 140 to a display device 142.

Server 102 may be configured to control access to one or more network resources by any connected client, for example, by client 104. A network resource may comprise, for example, an information object 144 stored in the data storage device 118 or by a server or group of servers 146 allied to server 102. The information object may comprise, for example, one or more executable applications, digital data for use in an application, access to a portion of server hardware or memory, or any combination of the foregoing.

Figure 2:
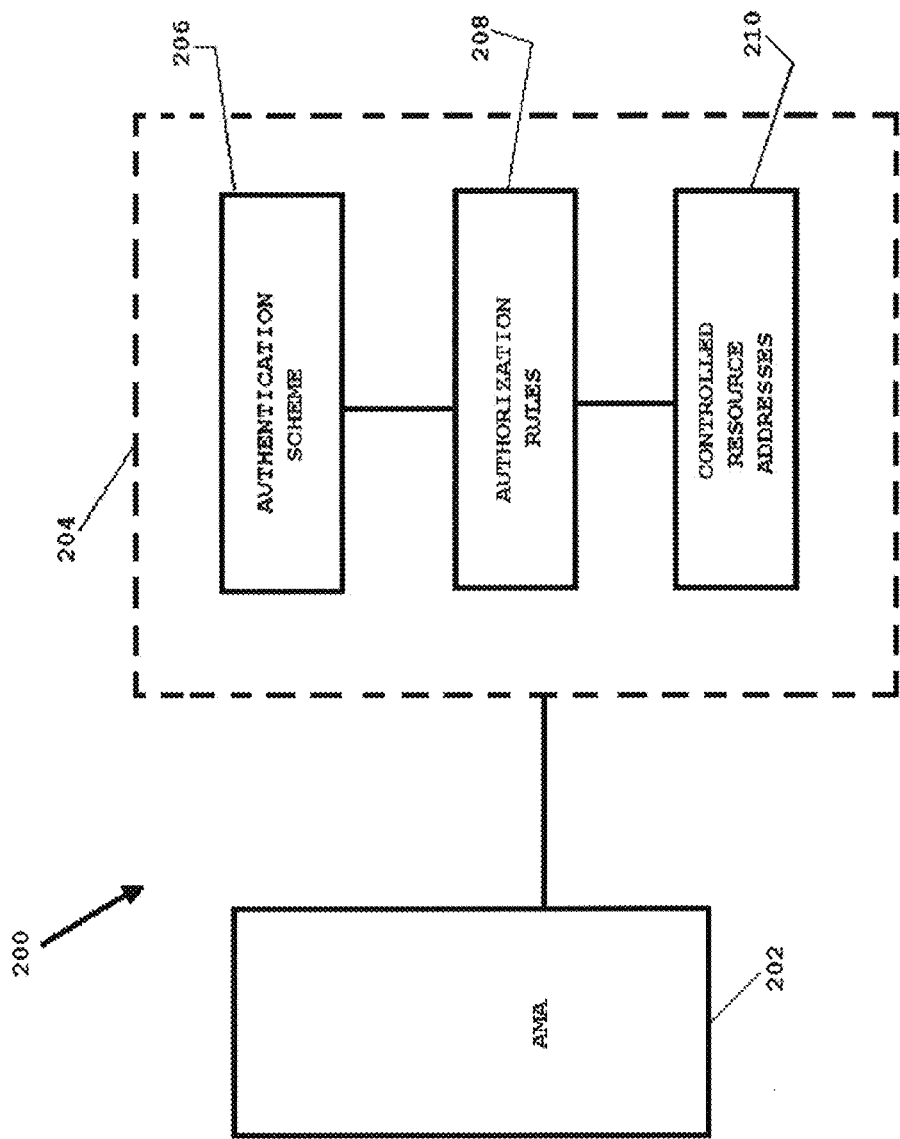
FIG. 2 is block diagram showing elements of an access management application for network access control.

FIG. 2 shows elements of a server-side access management system 200, comprising an access management application 202 and a related policy domain 204 defining operational elements and parameters for access control assigned to one or more client devices. These operational elements and parameters may comprise an authentication scheme 206 for authenticating access requests from the one or more clients, authorization rules 208 for determining whether or not a particular request is authorized to access a controlled network resource, and a list of one or more controlled resource addresses 210 identifying the network resources to which the policy domain applies. Creating or modifying a policy domain may be an administrator-level function of the AMA operating on a qualified server, enabling an authenticated administrator to control configuration and when necessary, create or modify one or more policy domains using the AMA.

To implement an authentication scheme 206, the AMA may call a software module, for example, a software plug-in (or a set of multiple such plug-ins) that enables customization of authentication rules. If multiple plug-ins are used, they may be configured for chained authentication, such that a failure to authenticate by any one authentication module causes authentication to fail, and the modules are run sequentially so long as authentication succeeds. The module may execute authentication rules to provide an output specifying whether or not a particular access attempt should be authenticated based on authentication rules defined for the authentication scheme 206. These rules may receive account (user) identifiers and passwords as well as client machine identifiers (machine fingerprints) as inputs, and determine an authentication status based on a comparison of the received values to values stored in one or more registers. For example, the authentication scheme may compare a client machine identifier for a machine originating an access request to a registry, thereby obtaining one of three possible status values: "enabled," "disabled," or "not recognized." If the returned status value is "disabled," then the AMA may deny the access request. If the returned status value is "enabled," then the AMA may also authenticate the user account for the request and proceed to authorization. If the returned status value is "not recognized," then the AMA may route the request to a procedure for registration of the client machine, subject to authentication of the user account.

Following a successful authentication of an incoming request, the AMA may perform an authorization process applying the authorization rules 208 to determine whether a specific user, as determined using by a user identifier for the access request, is authorized to the use the network resource specified by the access request, for example, by a URL in an HTTP request. The authorization rules may operate using a variety of input parameters, for example, user group membership, client device group membership, resource group membership, subscription status, or use limitations, to determine if the user is authorized to access the requested resource. For example, authorization rules may be specifically written to determine whether or not an access request originates from a user belonging to a specific authorized user group and from a device belonging to a specific authorized group of devices. If both conditions are not met, the AMA may deny access. If both conditions are met, the AMA may authorize access to the network resource. If only one of the two conditions is met, the AMA may initiate other actions such as initiating a user registration process or device registration process.

Network resource addresses 210 may be mapped to the policy domain 204. This means that the authentication scheme and authorization rules apply to determine access to all resources identified in the list of controlled resources 210. Conversely, a particular authentication scheme 206 may be applied to more than one policy domain. Authorization rules may be configured with each policy domain.

An overview of process flow for authentication and authorization by an AMA in response to an access request received from a client device follows. First, a server configured with an operational AMA receives a URL or other address for a network resource from a client device, such as may be generated using a browser or other client-level application in response to user input. The server passes the access request to the AMA, which determines whether or not the requested resource is included in a policy domain recognized by the AMA. If the resource is not found in a defined policy domain, the AMA passes the request on to its designated address, which may provide the requested resource to the originating client without interference from the AMA. If the requested resource is included in a policy domain of the AMA, the AMA processes the access request using the authentication scheme. If the request does not pass authentication, the AMA denies access to the requested resource and invokes an appropriate failure routine. If the request passes authentication, the AMA invokes the authorization rules, which operate on the authenticated user and device identities, and optionally other factors, to determine whether or not the particular access request is authorized. If the request is authorized under the rule set, the AMA passes the request to the requested resource address as an authorized request. If the request is not authorized, the AMA denies the request and invokes an appropriate failure routine.

Figure 3:
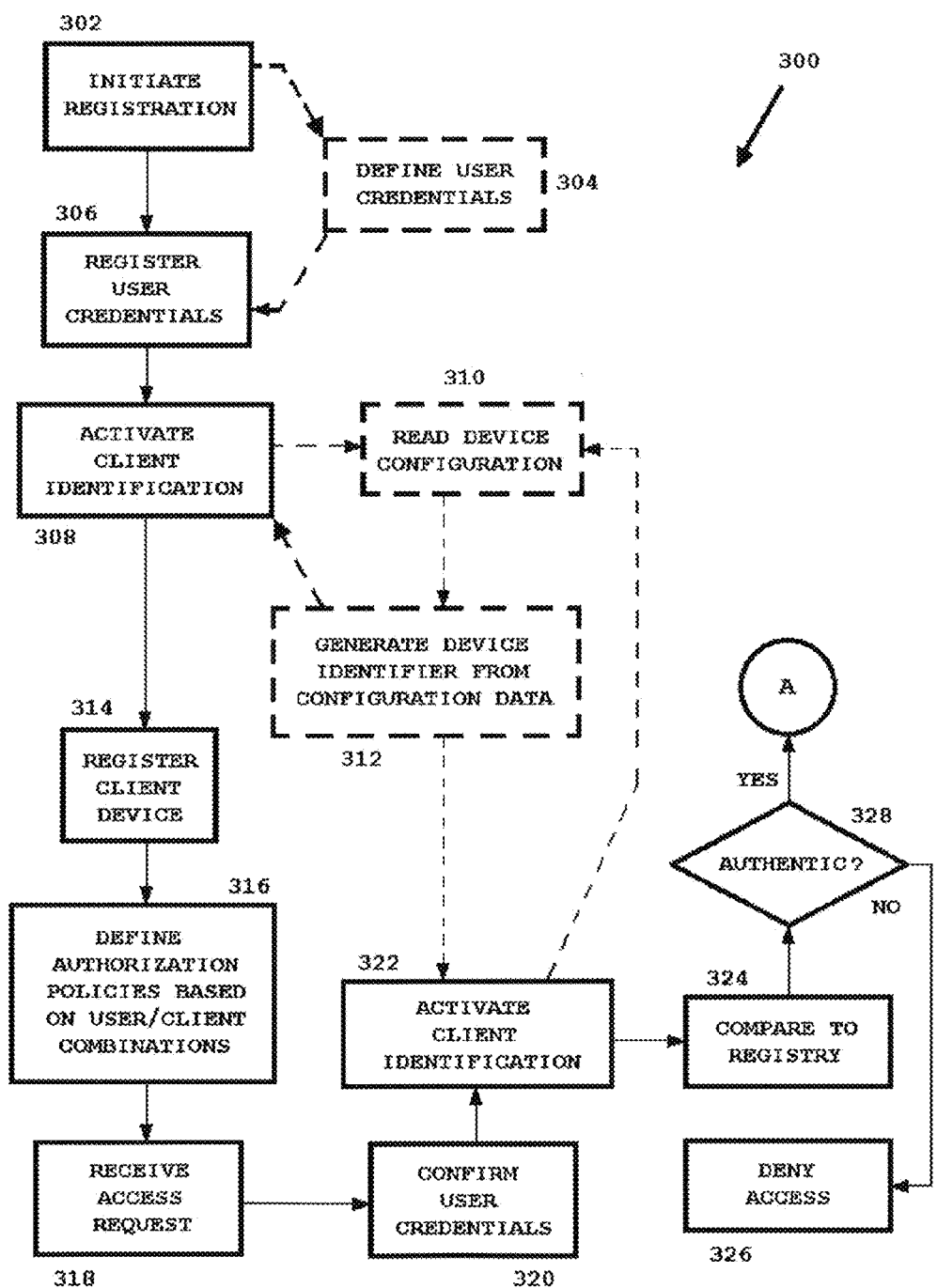
FIG. 3 is a flow chart showing examples of registration and authentication in a process for network access control.
Figure 4:
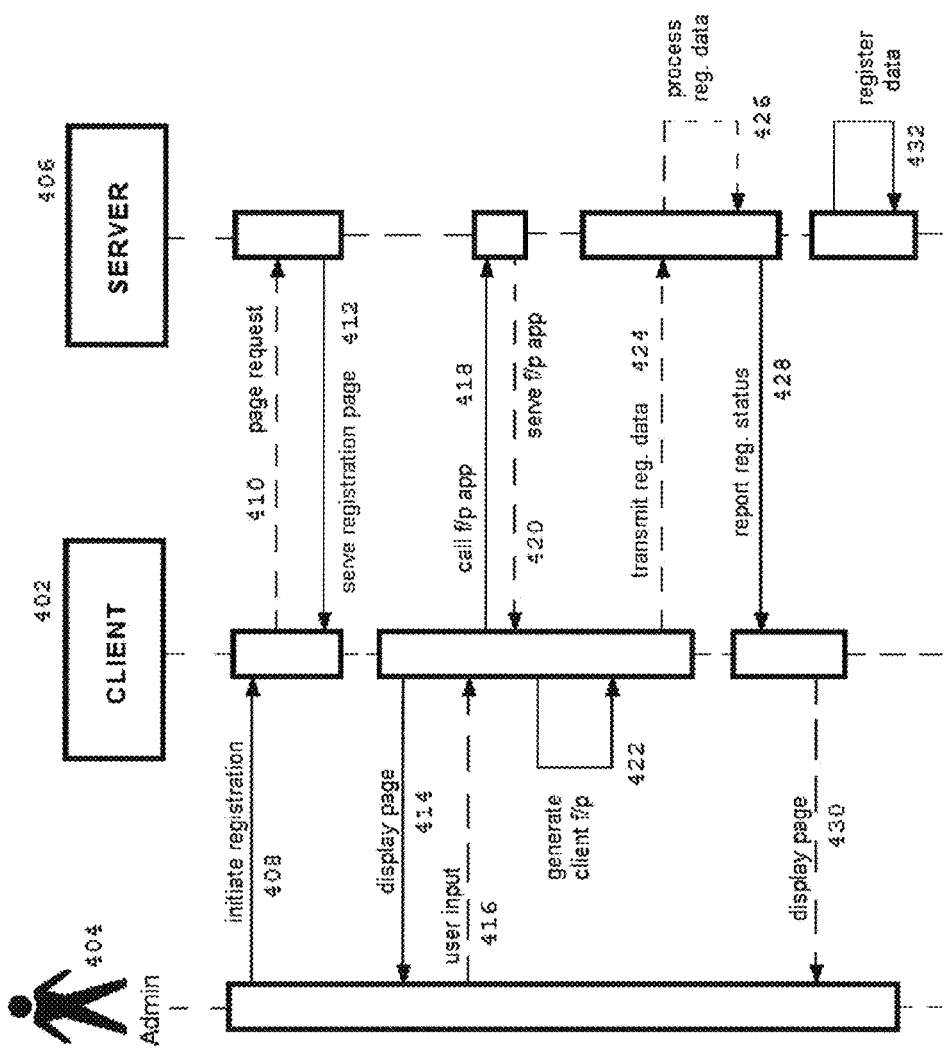
FIG. 4 is a sequence diagram showing a process of client registration for network access control performed by a server in cooperation with a client.
Figure 5:
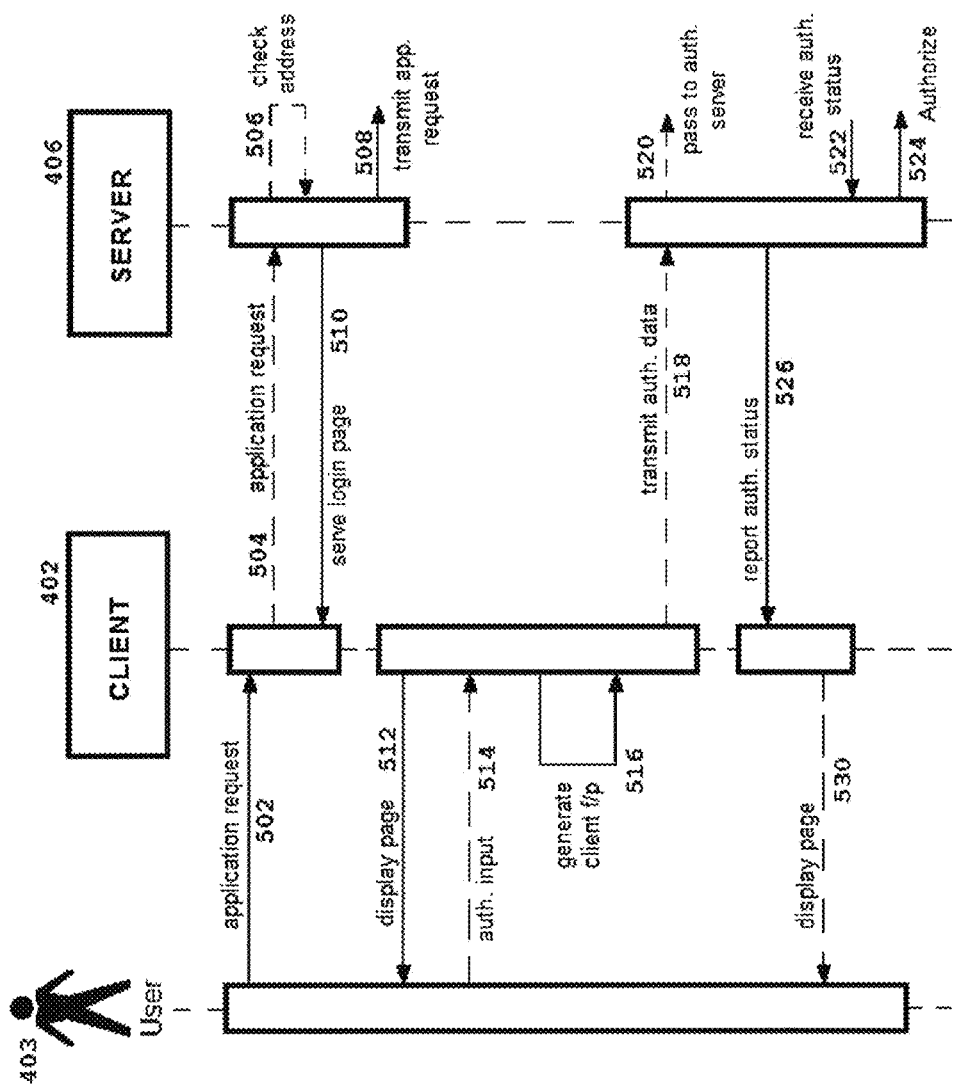
FIG. 5 is a sequence diagram showing a process of authentication performed by a client in cooperation with a server.
Figure 6:
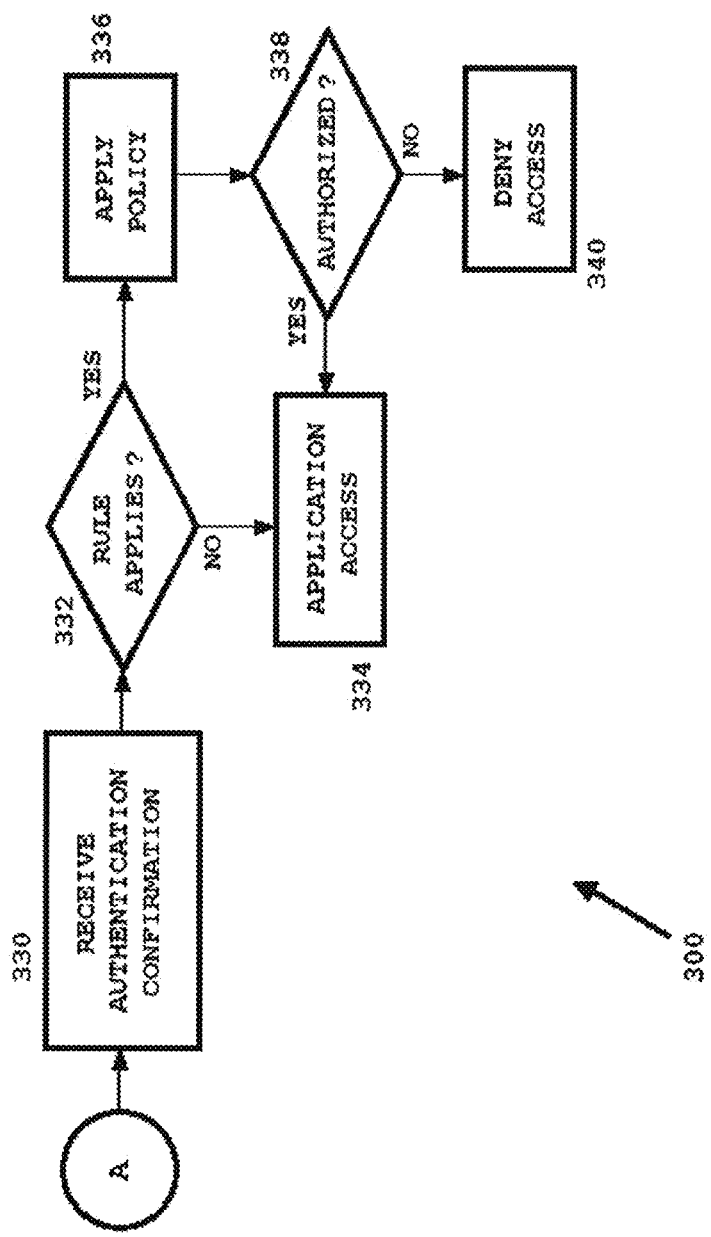
FIG. 6 is a flow chart showing an example of authorization in a process for network access control.

Network access control under the present technology may comprise three principal activities: (1) registration of user and client device identities, (2) authentication, and (3) authorization. FIGS. 3 and 6 diagram elements of a network access control method 300, wherein FIG. 3 describes registration and authentication, and FIG. 6 describes authorization. FIGS. 4 and 5 describe registration and authentication, respectively, as use cases showing cooperative interactions between a user or administrator, a client device, and a server. Referring first to FIGS. 3 and 4, registration may be initiated 302 at a client device 402 by an administrator 404. An administrator is a person or entity that possesses an identity and security key that a registration server 406 recognizes as authorizing initial registration of a user and client device. In some embodiments, the user may obtain temporary administrator status for herself, for example, after providing electronic payment for registration rights in the network access control system. In other embodiments, such as corporate networks, administrator rights may be restricted to designated individuals.

If a user account identifier and password have not been established, a user ID and password may be defined 304 by cooperation between the client and server, for example by exchange of secure data using one or more interactive forms. The process of defining a user identifier should ensure that the identifier is unique and relates to an identified individual, entity, or account. The process may also ensure that a password selected for the account is sufficiently robust to meet system security requirements. Once defined, user credentials may be registered 306 in a secure database by the server. Processes for defining user credentials are known in the art, and any suitable process may be used. Defining and registering user credentials is distinct from the subsequent process of defining and registering a client device identifier, with which FIG. 4 is primarily concerned.

Defining and registering a client device identifier may comprise activating a client identification process 308 at a client device. In the use case shown in FIG. 4, an administrator or other authorized user may access a registration application 408 on a device to be registered, for example, via a client browser. In response to the input from the administrator or authorized user, the client sends a request 410 to server 406 for a registration page or application. Once the server verifies authenticity of the request 410, the server may return the requested page or application 412 to the client 402. The client may then execute or load the requested page or application, causing responsive output, such as display 414 of a data entry form. The administrator or authorized user may enter information 416 such as an arbitrarily assigned device identifier, device description, and device status (for example, "enabled" or "disabled") by interacting with the form page.

The client may call an application for generating a device identifier, sometimes referred to herein as a "fingerprint," from the server 418. In the alternative, the server may provide this application without waiting for a specific call, for example, the server may transmit a fingerprinting application with the registration page 412. The server transmits the fingerprinting application 420 to the client 402, which executes the application to generate a client machine identifier 422, also called a "fingerprint."

To generate the fingerprint, the client device under control of the fingerprint application first reads 310 local system component parameter information according to a predefined algorithm to generate a data file, as shown in FIG. 3. The parameters checked to generate the fingerprint may include, for example, hard disk volume name, computer name, hard disc initialization date, amount of installed memory, type of processor, software or operating system serial number, or unique parameters associated with firmware installed in the client device. In general, the collected parameter information should be of a time-stable or static nature for the client, and used as input to an algorithm for generating a specific data file 312, 422. The resulting data file, also referred to herein as "fingerprint data," may be stored in a file in a memory of the client. Fingerprint data is described more detail below, and signifies data that is characteristic of hardware or firmware belonging to the client device, collected and assembled to have a very high probability (e.g., greater than 99.999%) of being unique to the client. It may be advantageous to store the fingerprint file in a transient file only, such as in a random-access memory (RAM) device, so that no record of the file remains after the fingerprint is generated. The stored data file comprises parameter data arranged in a defined order of data fields or records. Each data field may be of a known length, which may vary for each field. The fingerprint data file may be encrypted, secured or obfuscated using any suitable method. The client may transmit the entire fingerprint data file to a trusted server after it is first generated 422.

In the alternative, the client may transmit only a selected portion of the fingerprint data to the server. In such alternative cases, the client may request information from a trusted source for defining a sampling protocol, i.e., a data template, for deriving a portion from the fingerprint data to generate a client machine identifier. The sample-defining template may comprise information defining a filter or other transformation to be applied to the original fingerprint data file to generate a device fingerprint. In some embodiments, the template defines a map for selecting designated portions of the fingerprint data file. For example, the template may specify one or more bytes of data, but less than all data, be selected from each data field in a particular order or position. In these embodiments, the client may process the fingerprint data using the sample-defining template to generate a resulting working machine fingerprint, which may be stored in a local buffering system. The client, the source of the sample-defining template, or both may store the sample-defining information in a secure file for future reference, optionally first encrypting it. The client may then provide the machine fingerprint to the server or any other device that needs the fingerprint to identify or authenticate the client device.

In some embodiments, a trusted server maintains a record of the entire fingerprint data for the client, while the sample-defining template used to generate a working machine fingerprint is discarded after each use. The server may generate the sample-defining template and confirm that the machine fingerprint generated by the client is consistent with both the fingerprint data and with the sample-defining template. By specifying different sample-defining template at different times, the server may thereby authenticate the client without requiring the client to transmit the entirety of the fingerprint data for each authentication instance. Instead, the entire fingerprint data may provided from the client to the server during a single initialization session, which may be initiated and secured by the server using appropriate security tools, if it is transmitted at all. Subsequent sessions need not be as secure because the entirety of the fingerprint data is not retransmitted. The utility of the client's machine fingerprint for authentication of device identity may be thereby maintained in a more secure form.

At least one application running on the client computing device or otherwise accessing the computing device's hardware and file system may generate a machine fingerprint. The application may generate the fingerprint data using a process that operates on data indicative of the client's configuration and hardware. The fingerprint data may be generated using, user-configurable machine parameters, non-user-configurable machine parameters, or both as input to a process that generates a fingerprint data file as binary data.

Each machine parameter indicates a state or identifier for a hardware component, software component, or data component of the client. To obtain stable fingerprint data, relatively stable or static machine parameters should be selected. The machine parameters may be selected such that the resulting fingerprint data has a very high probability (e.g., greater than 99.999%) of being unique to the client. In addition, the machine parameters may be selected such that the fingerprint data includes at least a stable unique portion up to and including the entire identifier that has a very high probability of remaining unchanged during normal operation of the client. The resulting fingerprint data should be highly specific, unique, reproducible and stable as a result of properly selecting the machine parameters.

For example, a client device may comprise a motherboard on which reside a CPU and one or more auxiliary processors. The CPU may comprise a cache memory in communication with a random access memory (RAM). A video processor may communicate with these components via Northbridge hub and provide video data through video RAM to a display device. Other components may communicate with the CPU via a Southbridge hub, such as, for example a BIOS read-only memory or flash memory device, one or more bus bridges, a network interface device, and a serial port. Each of these and other components may be characterized by some data or parameter settings that may be collected using the CPU and used to characterize the client device. The technology disclosed herein may also be implemented on more highly integrated portable clients having programmable processors, memories and means for communicating with a server. Such clients also have components with non-user-configurable settings that may be used in compiling a device fingerprint. Examples of integrated portable clients include application-capable mobile phones, media players, personal organizers, and netbooks.

To generate the fingerprint 312, the application may operate by performing a system scan to determine a present configuration of the computing device. The application may then select the machine parameters to be used as input for generating the unique fingerprint data. Selection of parameters may vary depending on the system configuration. Once the parameters are selected, the application may generate the identifier.

Illustrative examples of various machine parameters that may be accessible to an application or applications running on or interacting with a processor of the client machine include: machine model; machine serial number; machine copyright; machine ROM version; machine bus speed; machine details; machine manufacturer; machine ROM release date; machine ROM size; machine UUID; and machine service tag. For further example, these machine parameters may include: CPU ID; CPU model; CPU details; CPU actual speed; CPU family; CPU manufacturer; CPU voltage; and CPU external clock; memory model; memory slots; memory total; and memory details; video card or component model; video card or component details; display model; display details; audio model; and audio details; network model; network address; Bluetooth address; BlackBox model; BlackBox serial; BlackBox details; BlackBox damage map; BlackBox volume name; NetStore details; and NetStore volume name; optical drive model; optical drive serial; optical details; keyboard model; keyboard details; mouse model; mouse details; printer details; and scanner details; baseboard manufacturer; baseboard product name; baseboard version; baseboard serial number; and baseboard asset tag; chassis manufacturer; chassis type; chassis version; and chassis serial number; IDE controller; SATA controller; RAID controller; and SCSI controller; port connector designator; port connector type; port connector port type; and system slot type; cache level; cache size; cache max size; cache SRAM type; and cache error correction type; fan; PCMCIA; modem; portable battery; tape drive; USB controller; and USB hub; device model; device model IMEI; device model IMSI; and device model LCD; wireless 802.11; webcam; game controller; silicone serial; and PCI controller; machine model, processor model, processor details, processor speed, memory model, memory total, network model of each Ethernet interface, network MAC address of each Ethernet interface, BlackBox Model, BlackBox Serial (e.g., using Dallas Silicone Serial DS-2401 chipset or the like), OS install date, nonce value, and nonce time of day. The foregoing examples are merely illustrative, and any suitable machine parameters may be used.

Because many client devices are mass-produced, using hardware parameters limited to the client box may not always provide the desired level of assurance that a fingerprint is unique to the client device. Use of user-configurable parameters may ameliorate this risk considerably, but at the cost of less stability. In addition, sampling of physical, non-user configurable properties for use as parameter input may also lessen the risk of generating duplicate fingerprint data. Physical device parameters available for sampling may include, for example, unique manufacturer characteristics, carbon and silicone degradation and small device failures.

Measuring carbon and silicone degradation may be accomplished, for example, by measuring a processor chip's performance in processing complex mathematical computations, or its speed in response to intensive time variable computations. These measurements depend in part on the speed with which electricity travels through the semi-conductor material from which the processor is fabricated. Using variable offsets to compensate for factors such as heat and additional stresses placed on a chip during the sampling process may allow measurements at different times to reproduce the expected values within a designated degree of precision. Over the lifetime of the processor, however, such measurements may change due to gradual degradation of the semi-conductor material. Recalibration or rewriting the fingerprint data may be used to compensate for such changes.

In addition to the chip benchmarking and degradation measurements, the process for generating a fingerprint data may include measuring physical, non-user-configurable characteristics of disk drives and solid state memory devices. For example, each data storage device may have damaged or unusable data sectors that are specific to each physical unit. A damaged or unusable sector generally remains so, and therefore a map of damaged sectors at a particular point in time may be used to identify a specific hardware device later in time. Data of this nature may also be included in a fingerprint file.

The application may read parameters from operating system data files or other data stored on the client, or actively obtain the parameters by querying one of more hardware components in communication with a processor on which the application is operating. A client processor provided with at least one application operating in this fashion of gather the machine parameters may comprise a means for collecting and generating fingerprint data.

This process of generating a working machine fingerprint may include at least one irreversible transformation, such as, for example, a cryptographic hash function, such that the input machine parameters cannot be derived from the resulting fingerprint data. Each fingerprint data, to a very high degree of certainty, cannot be generated except by the suitably configured application operating or otherwise having had access to the same computing device for which the fingerprint data was first generated. Conversely, each fingerprint, again to a very high degree of certainty, can be successfully reproduced by the suitably configured application operating or otherwise having access to the same computing device on which the identifier was first generated.

Optionally, the client device may store the fingerprint in a local memory. However, in some embodiments the fingerprint is stored by the client device only temporarily to facilitate transmission to the server 424 with other registration information entered by the system administrator or authorized user. This approach may lessen the risk of the fingerprint data being discovered and used for an unauthorized purpose. The client may also implement a pattern masking algorithm as described elsewhere in the specification, so that only a portion of the fingerprint data is transmitted to the client. This may reduce the risk that fingerprint data will be somehow intercepted during or after transmission, and used for some unauthorized purpose.

After receiving registration data 424 including the client fingerprint and device ID, description, and status, the server may process the registration data 426 to confirm that the registration data is valid. This may include confirming that the registration data conforms to the expected template, does not contain duplicate or non-unique identifiers, and was received according to a legitimate protocol. The server may report registration data status 428 to the client device, which may display the status 430 using a client output device. If the registration data is not valid, this determination may be reported and acted on by the administrator or authorized user. For example, the administrator may supply different registration data or select an alternative mode of generating the client fingerprint.

If the registration data is valid, the server may register the data 432, 314 by recording the registration data in a database or other suitable data structure. The server may create a record in a database of registered client fingerprints, to which the server may add the client device fingerprint, device identifier, description, and status. Optionally, one or more entries in the client registry may be associated by the server with one or more user or account identifiers stored in the user account registry. This may be useful, for example, to restrict the use of particular client devices for accessing controlled network resources to one or more particular authorized users of those devices. Data stored in the registry may be obfuscated or encrypted using any suitable method to prevent unauthorized use. Once registration is completed, the server may transmit a message to the client to inform the administrator or authorized user that the registration has been completed.

Defining or modifying authorization rules 316 for a policy domain may be performed at any suitable time. In some embodiments, registration of a new user or new client device may comprise an event provoking modification of the authorization rules, for example by adding a new user or new device to one or more user or device groups with specified authorization levels. In the alternative, or in addition, generic authorization rules may be defined to set access rights based on specified user/device combinations. Examples of such combinations include: (1) user and device both belong to an authorized group, (2) the user belongs to an authorized group while the device does not, (3) the device belongs to an authorized group while the user does not, and (4) neither the user nor the device belong to an authorized group. Further possibilities arise from memberships in different groups having different authority levels, which may greatly increase the number of possible combinations. The authorization rules should specify the appropriate authorization level for every possible combination of users and client devices within the defined scheme of available group memberships, to enable an appropriate access control action in response to access requests from different user/device combinations. Authorization rules may be defined within one or more policy domains of the application access manager. As previously noted, these policy domains may also specify addresses for one or more network resources to which the domain applies.

Once registration has been completed and authorization rules defined, the AMA is ready to handle requests for access to controlled network resources, by authenticating and then authorizing access requests. FIG. 3 starting at step 318 describes an example of authentication in response to an access request, while FIG. 5 shows a corresponding use case for the authentication process with respective roles of the server, client and user separately depicted. Reference is made to FIGS. 3 and 5 in tandem. A user 403 may originate an access request 502 by selecting or entering the address of a network resource using a client-side browser or other interface application. The client 402 may transmit the request 504 to the server 406 operating the AMA software. The server receives the access request 318 (FIG. 3) from the transmitting client.

The server may check the network resource address 506 defined by the access request to determine whether or not the resource address is specified in any applicable domain policy; i.e., to determine whether or not access to the resource is controlled. If the resource is not controlled, the server may transmit the resource request 508 to the resource server for fulfillment. If the resource is controlled, the server may transmit a login page 510 to the client, with may display the page to the user. The page may include a control object, for example an ActiveX™ or other suitable object for calling a fingerprint generating algorithm. When the login page is opened at the client to provide a display 512, the control object may be activated, causing the fingerprint generating application to generate a machine fingerprint 516 at the client 402, in any suitable manner as described above. Meanwhile, the login page may accept entry of user authentication data 514, such as user name and password, from the user 403. After the authentication data is entered and generated at the client, it may be obfuscated and/or encrypted as known in the art for secure transmission, and transmitted 518 to the server 406. In the alternative, the server may first confirm user credentials 320 received from the client, as shown in FIG. 3. If the user credentials are determined to be authentic, the server may activate an application on the client to generate the machine fingerprint 322, 310, 312 at the client device.

In either case, the server may confirm that the machine fingerprint is authentic may comparing to the registry of stored authentic machine fingerprints 324, as shown in FIG. 3. If the fingerprint exists and is indicated as valid and enabled in the fingerprint registry 328, the server may proceed to the authorization process diagrammed in FIG. 6 and described below. If the fingerprint is not valid or is not enabled, the server may deny access to the network resource 326, optionally transmitting a denial message to the client.

In the alternative, as diagrammed in FIG. 5, the server 406 may transmit the client fingerprint 518 to a separate authentication server 520 (not shown), which performs the function of authenticating the fingerprint and returns an authentication status 522 to the access management application on server 406. If the fingerprint status is "disabled," the server denies access to the resource and reports the status to the client 402, which may display the status to the user 403. If the status is "enabled," the server may proceed to an authorization process 524 such as described below in connection with FIG. 6. If the status is some other value, for example, "unknown," the server may take some other action, for example providing an opportunity for the user to register and enable the client device by supplying any required keys and completing the client registration process as previously described.

Referring to FIG. 6, after authentication is passed 330, the AMA may determine whether or not an authorization rule applies to the requested resource 332, by checking the domain policy defined for the user and device groups from which the access request originated. If no authorization rule applies to the requested resource, the server provides access to the requested resource. If an authorization rule exists for the requested resource, the AMA applies the applicable policy 336. The authorization rule should specify an authorization result for each of at least the following combinations: (1) user and device both belong to an authorized group, (2) the user belongs to an authorized group while the device does not, (3) the device belongs to an authorized group while the user does not, and (4) neither the user nor the device belong to an authorized group. A group of users may consist of one or more users. A group of devices may consist of one or more client devices. Hence the outcome of the policy depends on the specific value of the user ID and client fingerprint, in combination. Other factors may also be considered, for example specific authority levels for applicable user and device group memberships. Any desired amount of flexibility may be designed into the authorization rules. However, in each case the outcome of these rules, signifying authorization to use the requested resource, or lack of authorization, is specifically dependent on the combination of the user ID and client device fingerprint from which the access request originates. Access to specified resources from non-enable client devices may thereby be prevented.

If the outcome of the authorization policy indicates the user/client combination is authorized to use the requested resource 338, the AMA provides access to the requested resource 334. If the policy determination results in finding that the user/client combination is not authorized to use the requested resource 338, the AMA denies access 340, in any suitable fashion.

Having thus described a preferred embodiment of network access control, it should be apparent to those skilled in the art that certain advantages of the within system have been achieved. It should also be appreciated that various modifications, adaptations, and alternative embodiments thereof may be made without departing from the scope and spirit of the present technology. The following claims define the scope of what is claimed.

What is claimed is:
1. A method comprising:
receiving, at a server, an access request for access to at least one network resource from a client machine, the access request including account authentication information comprising an account identifier and password;

serving an executable object to the client machine operable to generate a client machine identifier comprising a machine fingerprint in response to receiving the access request, wherein the machine fingerprint is generated using at least one user-configurable machine parameter of the client machine, and at least one non-user-configurable machine parameter of the client machine;

obtaining the client machine identifier from the client machine; and controlling access to the network resource in response to the access request, by authorizing access to the network resource for the access request if the client machine identifier matches a registered machine identifier that is registered for use with the account authentication information and the account authentication information matches registered information for a valid account, but denying access to the network resource if the client machine identifier does not match a registered client machine identifier that is registered for use with the account authentication information;

wherein the at least one non-user-configurable machine parameter includes at least one selected from a group consisting essentially of: a measure of carbon degradation of a component of the client machine, a measure of silicon degradation of a component of the client machine, data representing one or more failures of one or more components of the client machine, and data representing one or more bad sectors of a component of the client machine.

2. The method of claim 1, further comprising registering a client machine identifier received from the client machine in an initial registration session.

3. The method of claim 1, further comprising maintaining a registry of account identifiers and client machine identifiers for use by the server in authorizing access to the network resource, wherein the registry associates each of the client machine identifiers with an at least one account identifier.

4. The method of claim 1, wherein the executable object on the client machine is operable to generate the client machine identifier by reading system data indicating a current system configuration of the client machine.

5. The method of claim 4, wherein the executable object activated on the client machine is further operable to process the system data to develop the client machine identifier.

6. The method of claim 1, further comprising activating the executable object by transmitting an activation signal from the server to the client machine, the activation signal operable to activate the executable object stored in a memory of the client machine.

7. The method of claim 1, further comprising maintaining a registry of addresses for different network resources, including the at least one network resource, identifying one or more account identifiers authorized for access to one or more different network resources.

8. A system for controlling access to network resources in response to access requests, the system comprising:

a processor;

at least one computer-readable medium that is operatively coupled to the processor;

an access management application that is stored in the computer-readable medium, is at least partially executable by the processor from the memory, and, when executed by the processor, causes the system to control access to the network resources in response to access requests by at least:

processing an access request for access to at least one network resource from a client machine, the access request including account authentication information comprising an account identifier and password;

serving an executable object to the client machine operable to generate a client machine identifier comprising a machine fingerprint in response to receiving the access request, wherein the machine fingerprint is generated using at least one user-configurable machine parameter of the client machine, and at least one non-user-configurable machine parameter of the client machine;

obtaining the client machine identifier from the client machine;

controlling access to the network resource in response to the access request, responsive to determining whether or not the client machine identifier matches a registered machine identifier that is registered for use with the account authentication information and the account authentication information matches registered information for a valid account;

wherein the at least one non-user-configurable machine parameter includes at least one selected from a group consisting essentially of: a measure of carbon degradation of a component of the client machine, a measure of silicon degradation of a component of the client machine, data representing one or more failures of one or more components of the client machine, and data representing one or more bad sectors of a component of the client machine.

9. The system of claim 8 wherein the access management application, when executed by the processor, causes the system to control access to the network resources in response to access requests by at least also:

registering a client machine identifier received from the client machine in an initial registration session.

10. The system of claim 8 wherein the access management application, when executed by the processor, causes the system to control access to the network resources in response to access requests by at least also:

maintaining a registry of account identifiers and client machine identifiers for use by the means for authorizing access to the network resource, wherein the registry associates each of the client machine identifiers with an at least one account identifier.

11. The system of claim 8 wherein the executable object on the client machine is operable to generate the client machine identifier by reading system data indicating a current system configuration of the client machine.

12. A non-transitory computer-readable medium encoded with software, that when executed by a processor, causes a computer to perform the functions of:

receiving an access request for access to at least one network resource from a client machine, the access request including account authentication information comprising an account identifier and password;

serving an executable object to the client machine operable to generate a client machine identifier comprising a machine fingerprint in response to receiving the access request, wherein the machine fingerprint is generated using at least one user-configurable machine parameter of the client machine, and at least one non-user-configurable machine parameter of the client machine;

obtaining the client machine identifier from the client machine; and controlling access to the network resource in response to the access request, by authorizing access to the network resource for the access request if the client machine identifier matches a registered machine identifier that is registered for use with the account authentication information and the account authentication information matches registered information for a valid account, but denying access to the network resource if the client machine identifier does not match a registered client machine identifier that is registered for use with the account authentication information;

wherein the at least one non-user-configurable machine parameter includes at least one selected from a group consisting essentially of: a measure of carbon degradation of a component of the client machine, a measure of silicon degradation of a component of the client machine, data representing one or more failures of one or more components of the client machine, and data representing one or more bad sectors of a component of the client machine.

13. The computer-readable medium of claim 12, further encoded with software configured to cause the computer to register a client machine identifier received from the client machine in an initial registration session.

14. The computer-readable medium of claim 12, further encoded with software configured to cause the computer to access a registry of account identifiers and client machine identifiers when authorizing access to the network resource, wherein the registry associates each of the client machine identifiers with an at least one account identifier.

15. The computer-readable medium of claim 12, wherein the executable object on the client machine is operable to generate the client machine identifier by reading system data indicating a current system configuration of the client machine.

16. The computer-readable medium of claim 12, further encoded with software configured to cause the computer to activate the executable object by transmitting an activation signal from the computer to the client machine, the activation signal operable to activate the executable object stored in a memory of the client machine.

17. The computer-readable medium of claim 12, further encoded with software configured to cause the computer to access a registry of addresses for different network resources, including the at least one network resource, associated with particular account identifiers, to determine if the access request should be authorized for access to one or more different network resources.

* * * * *